(12) United States Patent
Gonzales et al.

(10) Patent No.: US 7,054,804 B2
(45) Date of Patent: May 30, 2006

(54) METHOD AND APPARATUS FOR PERFORMING REAL-TIME SUBTITLES TRANSLATION

(75) Inventors: Cesar A. Gonzales, Kotonah, NY (US); Jack Kouloheris, Ossining, NY (US); Vadim Sheinin, Mount Kisco, NY (US)

(73) Assignee: International Buisness Machines Corporation, Armonk, NY (US)

( * ) Notice: Subject to any disclaimer, the term of this patent is extended or adjusted under 35 U.S.C. 154(b) by 657 days.

(21) Appl. No.: 10/152,357

(22) Filed: May 20, 2002

(65) Prior Publication Data

US 2003/0216922 A1    Nov. 20, 2003

(51) Int. Cl.
*G10L 21/00* (2006.01)
(52) U.S. Cl. .......................................................... 704/8
(58) Field of Classification Search .............. 704/2–10, 704/277
See application file for complete search history.

(56) References Cited

U.S. PATENT DOCUMENTS

| | | | |
|---|---|---|---|
| 6,233,546 B1 * | 5/2001 | Datig | 704/7 |
| 6,393,389 B1 * | 5/2002 | Chanod et al. | 704/7 |
| 6,407,754 B1 * | 6/2002 | Hetherington et al. | 715/765 |
| 6,411,948 B1 * | 6/2002 | Hetherington et al. | 707/2 |
| 6,460,015 B1 * | 10/2002 | Hetherington et al. | 704/8 |
| 6,496,844 B1 * | 12/2002 | Hetherington et al. | 715/536 |
| 6,745,161 B1 * | 6/2004 | Arnold et al. | 704/7 |
| 6,820,055 B1 * | 11/2004 | Saindon et al. | 704/235 |

FOREIGN PATENT DOCUMENTS

JP   2000092460 A   3/2000

* cited by examiner

*Primary Examiner*—Susan McFadden
(74) *Attorney, Agent, or Firm*—Daniel P. Morris; Harrington & Smith, LLP

(57) ABSTRACT

A method and apparatus is disclosed for presenting information to a user of an audiovisual appliance such as a television receiver, a set top box, or a DVD or a VCR player. The method includes extracting source text from a graphical representation of the source text in an associated audiovisual program; translating the extracted source text into a target text in a language different than a language of the source text; and presenting the target text in a human perceptible format in a synchronized manner with the associated audiovisual program. Translating the extracted source text may include an initial step of identifying the source language.

24 Claims, 6 Drawing Sheets

METHOD AND APPARATUS FOR PERFORMING REAL-TIME SUBTITLES TRANSLATION

TECHNICAL FIELD

These teachings relate generally to method and apparatus for performing text translation from a source language to a target language and, more specifically, relate to a system wherein the source language information is received synchronized with a television broadcast or a pre-recorded audiovideo or audiovisual program (including but not limited to DVD or a VCR tape).

BACKGROUND

There are several means for communicating and displaying audiovisual programs of educational, commercial or entertainment value. These means include, but are not limited to, TV broadcasting and DVD or VCR playback. Any such program is made up of both audio and visual signals, or is made up of components that are coded together using analog or digital standard formats. The well known NTSC format, for example, is the standard for all analog audio and video TV broadcasting in the United States of America. In contrast, the DVD format uses a compressed digital representation of the video and audio signals. Frequently the audiovisual information is also coded together with textual information. A prominent example of this practice is that of the closed captioning (CC) of TV broadcasting in the United States. In order to allow the hearing impaired to participate in the enjoyment of TV programs, the Federal Communications Commission requires that all TV broadcasting in the United States include a coded signal of text that is representative of audio events and the speech content of the audio component of the TV program. In CC this textual information is embedded in the NTSC signal by representing text by binary codes corresponding to the letters of the alphabet, and using these codes to modulate portions of the NTSC signal. An EIA standard (EIA-608, Revision A, Recommended practice for Line 21 data service) describes the technical details of this process. A TV receiver capable of decoding and displaying closed captioned programs must extract these codes and then display the corresponding text as a subtitles on the TV screen. The process of displaying the text typically uses what is referred to as a font generator module; i.e., an electronic module that converts the binary codes into signals that drive the display of the text on the TV screen. All TV receivers presently sold in the United States are required to contain this type of font generator module.

Another, more conventional method to convey audio information in textual form is through graphical subtitles. As opposed to CC, where the alphanumeric characters that form displayable text are directly coded and transmitted, in graphical subtitling these characters are first converted into a graphical representation of same and then transmitted or coded in the graphical form. The advantage of the latter method over the former one is that no font generation is required to display the text, as the graphical representation as received can be directly overlaid on the TV screen. In addition to the simplicity in display electronics implementation, transmitting graphical representations of subtitles also allows the producer of the audiovisual content to have total control over the appearance of the subtitle text. That is, the producer can choose fonts, colors and other characteristics for the subtitle text in view of artistic and other criteria, such as having a least intrusive effect on the audiovisual content being displayed, and the producer can also dynamically change the appearance and aesthetics of the subtitle text as desired.

Graphical subtitles are commonly used to transmit textual information representative of the audio component of the TV program. One prominent example is found in the Digital Video Broadcast (DVB) standards for terrestrial, satellite and cable transmission of digital TV used in most of the world, including in satellite digital broadcasting in the United States. Another prominent example of so-called graphical subtitling can be found in the standards for pre-recorded content.

In the case of pre-recorded DVD programs, graphical subtitling is often used to support subtitles for more than one target language. However, the number of supported target languages is generally limited to but a few, which has been found to be insufficient for those countries with highly diverse ethnic populations.

The presence of closed captioning or graphical subtitling, however, provides an opportunity to implement language translation services and subtitles for an arbitrary number of target languages. To implement this service, the textual information in the source language must be extracted and translated to the target language of the viewer using text-to-text translation technology. Examples of this technology are found in several translation services that are available on the Internet.

As can be appreciated, extracting the textual information from the stream of binary codes used in closed captioning is relatively simple, however performing this same task with graphical subtitles is not simple nor intuitive.

With regard to solutions to the problems described above, Japanese patent 2000092460 (Mar. 31, 2000) describes a method for the automatic translation of CC text information from a source to a target language. This patent does not describe a method for the more common case of graphical subtitles and it does not describe the use of extensions for recognizing the source language automatically.

SUMMARY OF THE PREFERRED EMBODIMENTS

The foregoing and other problems are overcome, and other advantages are realized, in accordance with the presently preferred embodiments of these teachings.

In one of its aspects this invention provides a method and apparatus for extracting textual information received in a graphical subtitling format representative of a source language script, for translating the received source text into a target language text, and optionally displaying the translated text on a display screen.

In another one of its aspects this invention automatically recognizes the source language, and selects an appropriate translation process in accordance with the desired target language.

The teachings of this invention solve the foregoing problems related to displaying graphical subtitles. In one presently preferred embodiment of this invention text is extracted from the graphical representations using character recognition or another pattern matching technique. While similar methods are commonly used today in electronic scanners, where they are referred to as Optical Character Recognition (OCR), the use of simpler techniques is possible in a television application since the graphical representations are normally not contaminated by noise as is typically the case with electronic scanners. In certain cases, where the fonts used in generating the graphical subtitles are known to the decoding device, the process of extracting text may be reduced to simple look-up-table instructions. In any case, the resulting translated text may then be displayed as subtitles on the display screen by any of a number of methods, including using a font generator module. Optionally, the translated text could also be inputted into a text-to-speech synthesis unit to generate an audible signal representative of the subtitle information. A further embodiment of this invention may incorporate methods to automatically recognize the source language without requiring any prior viewer set up or interaction. This is of particular interest with currently available cable and satellite multilingual programming offerings.

Disclosed herein in accordance with the teachings of this invention are a real-time method and an apparatus for performing translation from a source language to a target language, and optionally displaying the results as subtitles on a display screen, such as a television screen. The source language information is assumed to be embedded in graphical form as part of displayable content, typically either broadcast or pre-recorded TV programs. The embedded graphical information is used to extract the corresponding textual information of the source language using either character recognition or another pattern matching technique. A text-to-text translation software program is then used to generate textual data for the target language. The textual data that results from the language conversion process are displayed on the TV screen, such as by displaying the textual data as subtitles or closed caption, and/or the textual data can be synthesized as speech.

In one presently preferred embodiment of this invention the method is practiced within and by a decoder of digitally transmitted or pre-recorded audiovisual programs of a type that include graphical subtitles. Examples of such decoders are digital Set Top Boxes and DVD players. In this embodiment the graphical subtitles are processed using at least one look-up table (LUT), or by character recognition or some other pattern matching technique. The textual information extracted in this manner is further processed in a text-to-text machine translation block. Optionally, a first function of this block is to automatically identify the language of the source. Text translated to the target language is then optionally displayed on the video screen by any of several possible and known techniques. For example, the translated text can be displayed by generating binary codes representative of CC data which are later passed to a font generation module, or alternately by overlaying a graphical representation of the text on the display memory buffer of a digital video decoder, such as an MPEG-2 decoder. Optionally, textual information may be converted to an audio format and presented as speech by a text-to-speech synthesis module or function.

In a further embodiment of this invention the method is used with analog video signals incorporating textual subtitles. Examples of such sources are analog TV and the output of VCR or DVD players. The video is digitized by means of an analog-to-digital converter, and the digitized video data is then processed to identify the location of blocks of text characters which are then processed as if they were graphical subtitles. After character recognition is performed by any suitable means the output text is processed further in a text-to-text machine translation block. Optionally, the first function of this block is to automatically identify the language of the source. Preferably the text is translated from the detected language to a language chosen by a viewer. The translated text and the audio and video data are multiplexed together whereby either subtitles or closed captions containing the translated text are generated. Optionally, the textual information may be presented in an audio format as speech by executing a text-to-speech synthesis function. The digital signal may then be converted back to the analog domain to be output from the device.

The methods and apparatus operate in substantially real time as the audiovisual program is received or played back. Suitable delays are provided for ensuring synchronicity between the generated translated textual information and the program content.

A method and apparatus are disclosed for presenting information to a user of an audiovisual appliance such as, but not limited to, a television receiver, a set top box, or a DVD or VCR player. The method includes extracting source text from a graphical representation of the source text in an associated audiovisual program; translating the extracted source text into a target text in a language different than a language of the source text; and presenting the target text in a human perceptible format in a synchronized manner with the associated audiovisual program. Translating the extracted source text may include an initial step of identifying the source language.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
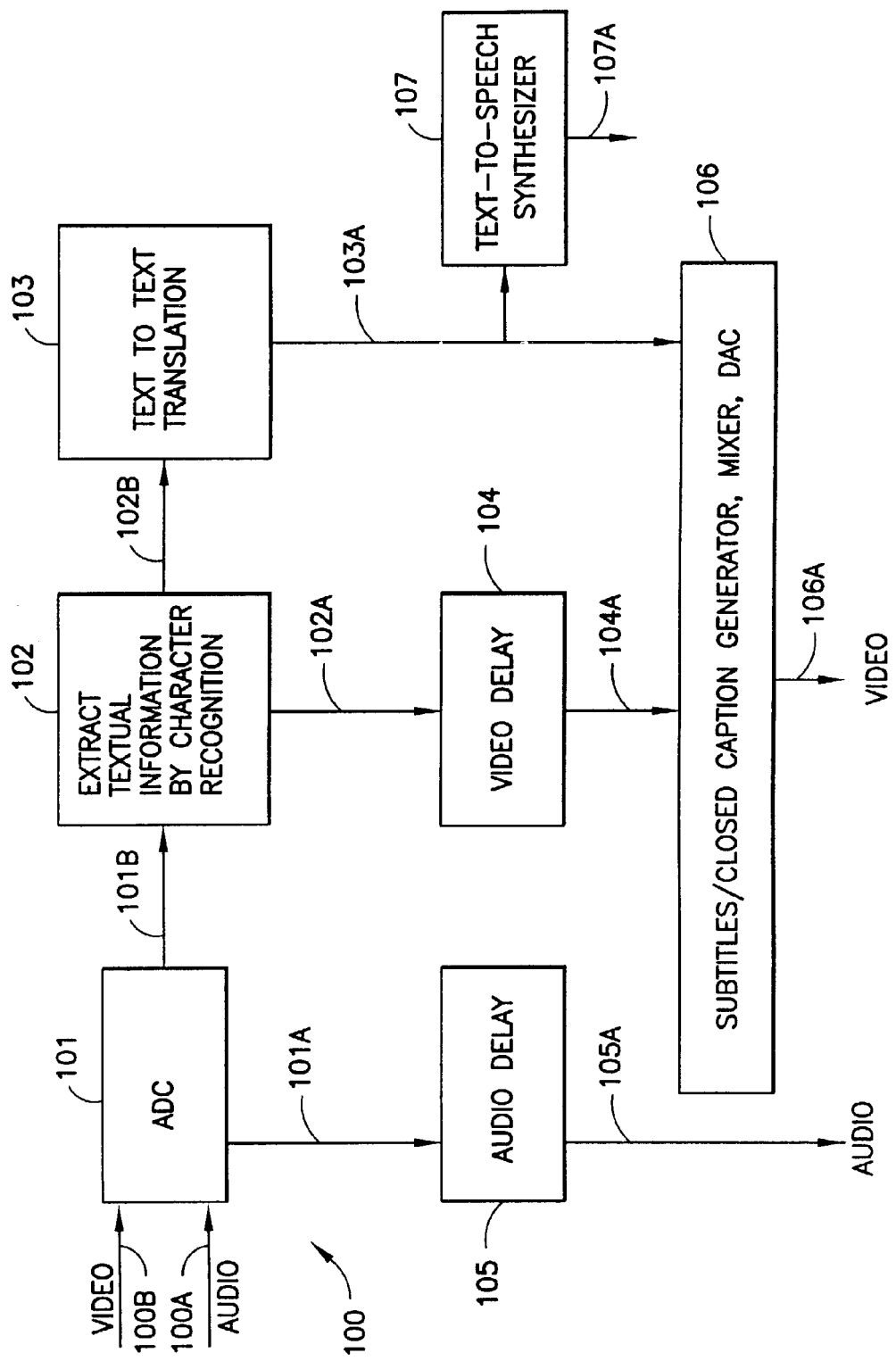
FIG. 1 illustrates a block diagram of a first embodiment of apparatus in accordance with this invention for performing a subtitles translation from a language of origin (or source language) to a viewer language (or target language) during reception of a television program, or during DVD or VCR tape playback.

Reference is made to FIG. 1 for illustrating a block diagram of a first embodiment of a system 100 that is constructed and operated in accordance with this invention for performing a subtitles translation from a language of origin (or source language) to a viewer language (or target language) during reception of a transmitted audiovisual (e.g., television) program, or during DVD or VCR tape playback of an audiovisual program. In the system 100 certain input audio analog signals 100A and video analog signals 100B are digitized by an analog-to-digital converter 101. The digitized audio data 101A is recorded in an audio delay buffer 105 to enable full synchronization with the video signal and translated subtitles data at later stages. The digitized video data 101B is processed in a character recognition block 102 having two outputs: output 102A which is the digitized video itself, and an output 102B which represents recognized textual information in the original (i.e., as-received) language. The digital video signal appearing at output 102A is recorded in a video delay buffer 104 to enable full synchronization with the audio and translated subtitles data at later stages. The time delay provided by buffers 105 and 104 is preferably equal to the total required time to process and translate the subtitles or closed caption information, plus any system latencies and delays.

The character recognition block 102 recognizes the graphical representation of characters that are present in the digitized video signal 101B by using any one of a number of suitable methods, such as by using a method based on pattern matching and/or OCR.

Figure 3A:
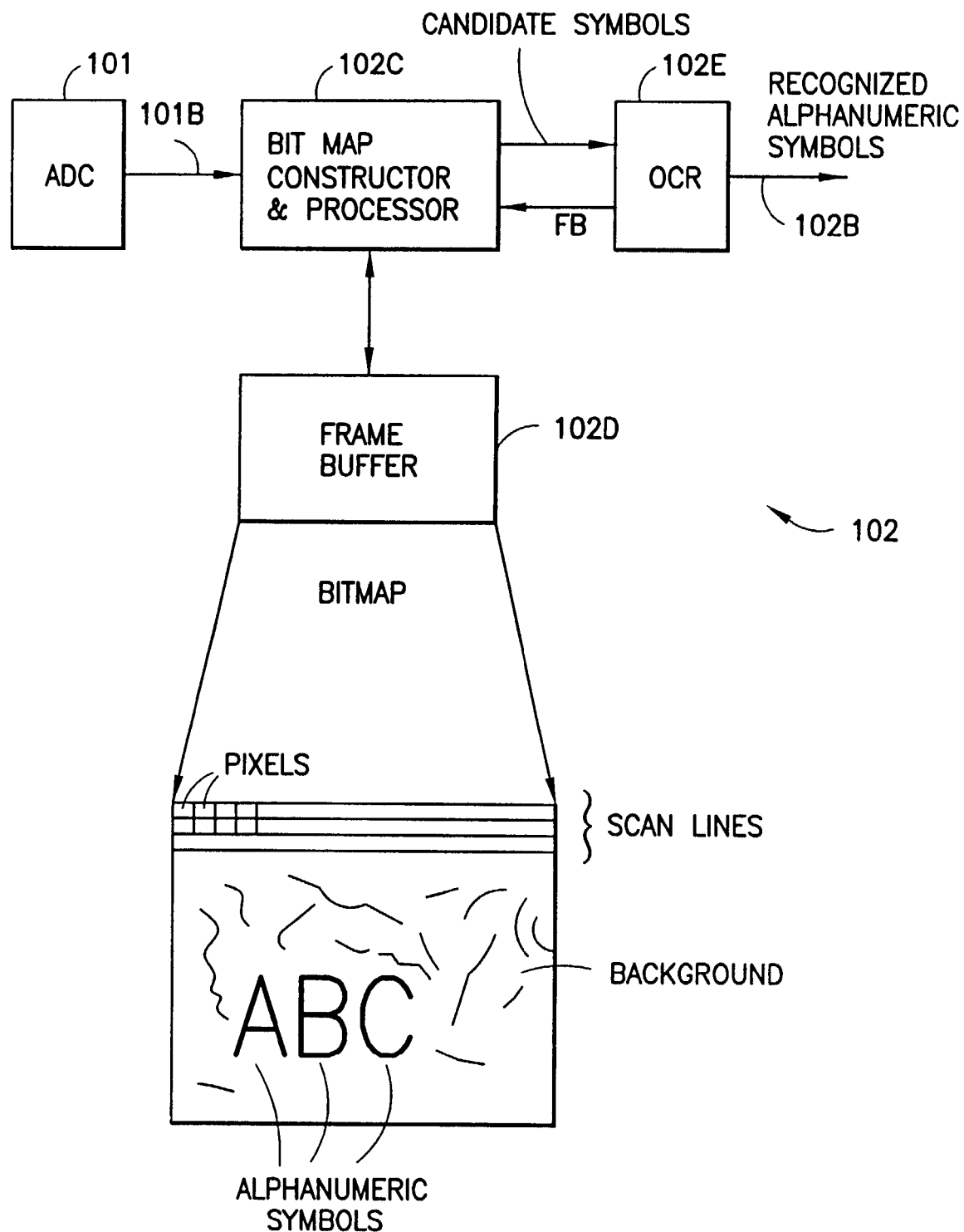
FIG. 3A is a block diagram of the text extraction and character recognition block of FIG. 1.

Referring to FIG. 3A, the digital output 101B of the ADC 101 represents luminance and chrominance signals, assuming a color television signal that is received from a cable or an antenna, or that is obtained from a DVD or VCR tape. By example, the color television signal may be compatible with the American NTSC (National Television Systems Committee) color television system, or with the European PAL (Phase Alternation Line rate) color television system, or with the French-Former Soviet Union SECAM (Sequential Couleur avec Memoire) color television system. The most significant difference between these three systems is the number of scan lines. NTSC uses 525 lines (interlaced,) while both the PAL and SECAM systems use 625 lines. NTSC frame rates are slightly less than ½ the 60 Hz power line frequency, while PAL and SECAM frame rates are exactly ½ the 50 Hz power line frequency.

Regardless of the color television system used the digitized signals are applied to a bit map constructor and processor 102C that is bidirectionally coupled to a memory, referred to herein for convenience as a frame buffer 102D. The processor 102C constructs a video frame in the frame buffer 102D so as to contain pixels and scan lines corresponding to a video image that would be viewed on a television receiver. In the preferred embodiment some number of frames are accumulated in the frame buffer 102D and averaged or otherwise combined together when stored in the frame buffer 102D. The exact number of frames to be accumulated to form the bit map is selected based on some criteria related to how rapidly the displayed alphanumeric information would be expected to change. One suitable but non-limiting value for the number of accumulated frames corresponds to a number of frames displayed in 0.5 second, or about 15 frames for a NTSC formatted television signal. The result is that the frame buffer 102D contains memory locations corresponding to the alphanumeric symbols or textual characters that may be present in a subtitle or a closed caption, while the background video, assuming movement in the video image at the frame rate or near the frame rate, will appear as a noisy background signal. After some desired number of frames are accumulated (e.g., from one to about 15 for a NTSC formatted television signal), the content of the frame buffer 102D is processed by an OCR block 102E. The OCR block 102E, or some other pattern recognizer, may operate in a manner similar to a conventional OCR function that is used to process a scanned and digitized page to locate and recognize individual alphanumeric characters. Optional feedback (FB) can be provided to the processor 102C for indicating the status of the operation of the OCR block 102E. For example, if the background becomes excessively noisy, making character recognition difficult, the FB signal may cause the processor 102C, for example, to accumulate fewer video frames to form the bitmap, or to apply some type of filtering to the bitmap prior to the operation of the OCR block 102E. The OCR block 102E can also vary the size of the sampling window within which it examines the bitmap for potential characters. The end result is recognized alphanumeric characters or symbols that are output on line 102B to the text-to-text translator 103 where the recognized textual information 102B is processed further.

It should be noted that in most cases subtitles information is located in the bottom portion of the video screen image. As such, in order to decrease the amount of required frame buffer 102D memory, while increasing processing speed, it may be preferred to only accumulate and process video frame information that corresponds to the bottom portion (e.g., the bottom third or bottom quarter) of the video image.

It should further be noted that it is not necessary that the target text be stationary in the image, and that scrolling or crawling text may also be recognized and translated.

Figure 4:
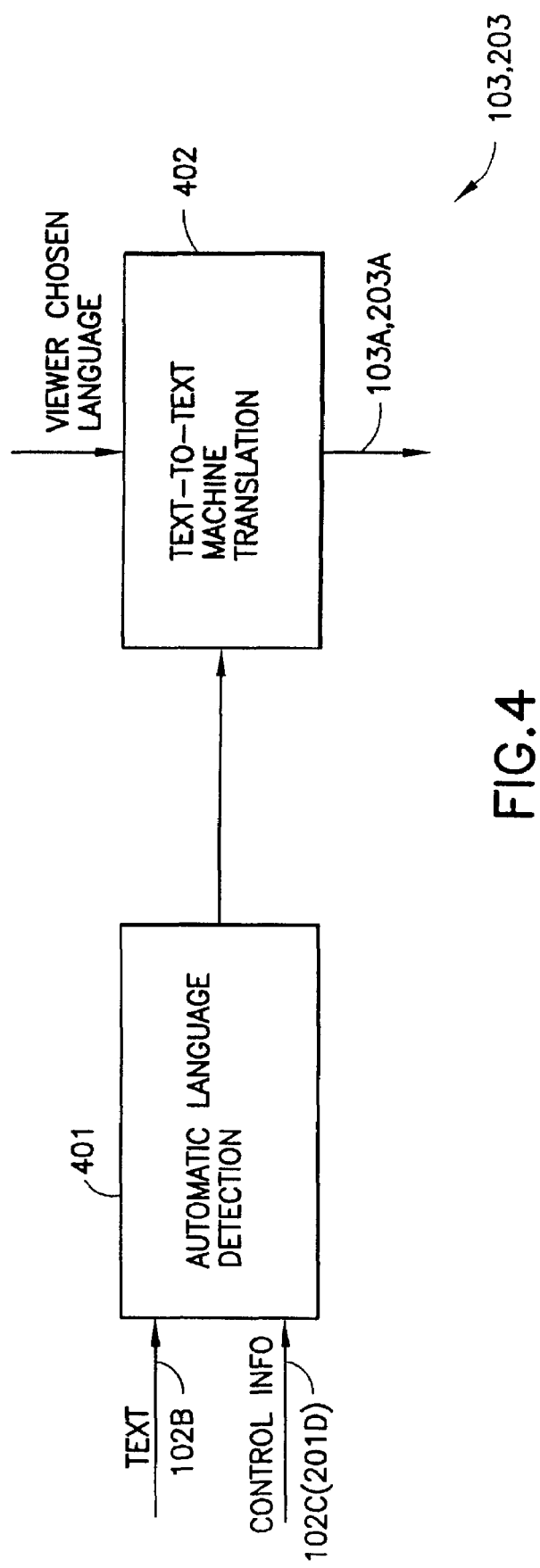
FIG. 4 is a block diagram of the text translation block shown in FIGS. 1 and 2.

A logical block diagram for text-to-text machine translation block 103 is shown in FIG. 4. A first function of text-to-text machine translation block 103 is to automatically identify the source language if requested by the viewer. For the first embodiment of this invention the automatic language detection is performed in block 401 of FIG. 4, and is based on the character set used in the source language and optionally also on any special features or characteristics of the language, or even on explicitly given language identifiers, all of which are referred to generally as control information 102C. Upon completion of the operation of block 401 the text is translated from the original, and possibly automatically detected, language (the source language) to the language chosen by a viewer (the target language) in a text-to-text machine translation block 402. Translation can be performed by any suitable technique for converting an alphanumeric string that represents a sentence in one language to a sentence in another language. The translated text is output on line 103A to block 106 of FIG. 1. Either subtitles or closed captions with translated text are generated in block 106. The translated text and video data from the video delay buffer 105 are then combined in block 106 and multiplexed with the delayed digitized audio data output from the audio buffer 105 before being directed to the video display (not shown in FIG. 1). The end result is that the source text is presented to the viewer after translation to the target text, with the translation being to a language selected by the user (e.g., English to French, Swedish to Hebrew, etc.)

Figure 5:
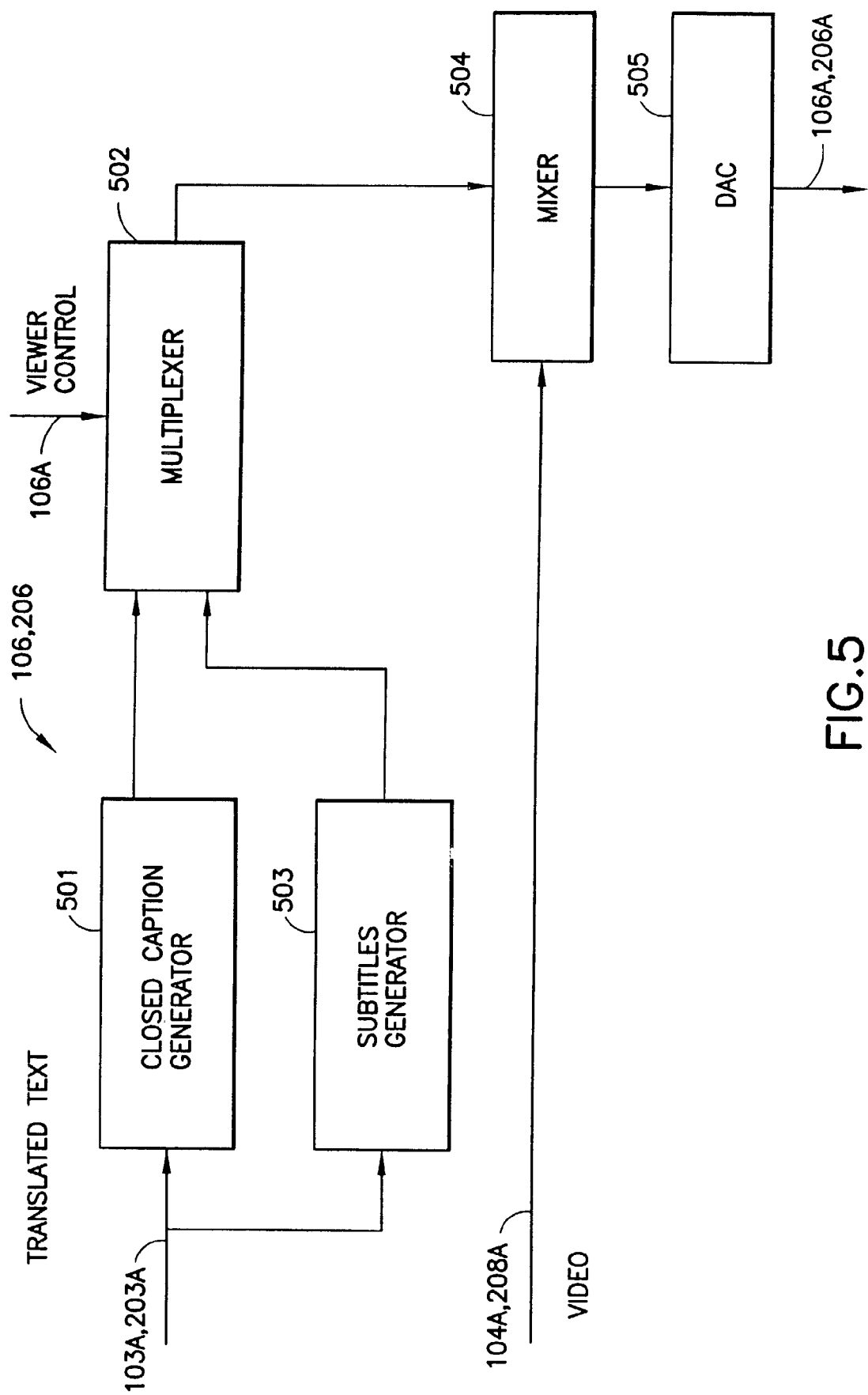
FIG. 5 illustrates a block diagram of apparatus for practicing the teachings of this invention, the apparatus including circuits and logic blocks providing closed caption/subtitles generation, mixing with a video signal and digital-to-analog conversion as shown in FIGS. 1 and 2.

FIG. 5 illustrates a block diagram of the subtitles/closed caption generator, mixer and digital to analog converter (DAC) block 106. The translated text 103A is applied to both a closed caption generator 501 and a subtitles generator 503. The outputs of blocks 501 and 503 are fed into multiplexer 502 that receives a control signal 106A from the viewer by means of, for example, a remote control (e.g., IR) link. The output of block 502 is input to block 504 which mixes the delayed video digital signal 104A with the selected one of closed caption or subtitles data output from the multiplexer 502. The output of mixer block 504 is input to a digital-to-analog converter (DAC) 505 that produces an analog TV signal, for example an analog TV signal in the NTSC format.

Note in FIG. 1 that the textual information may be presented to the viewer in an audio (speech) signal format by performing text-to-speech synthesis in block 107. The choice of textual or audio (or both) is preferably made user-selectable. The output 207A of the synthesizer 207 can be multiplexed into the audio signal 105A.

Figure 2:
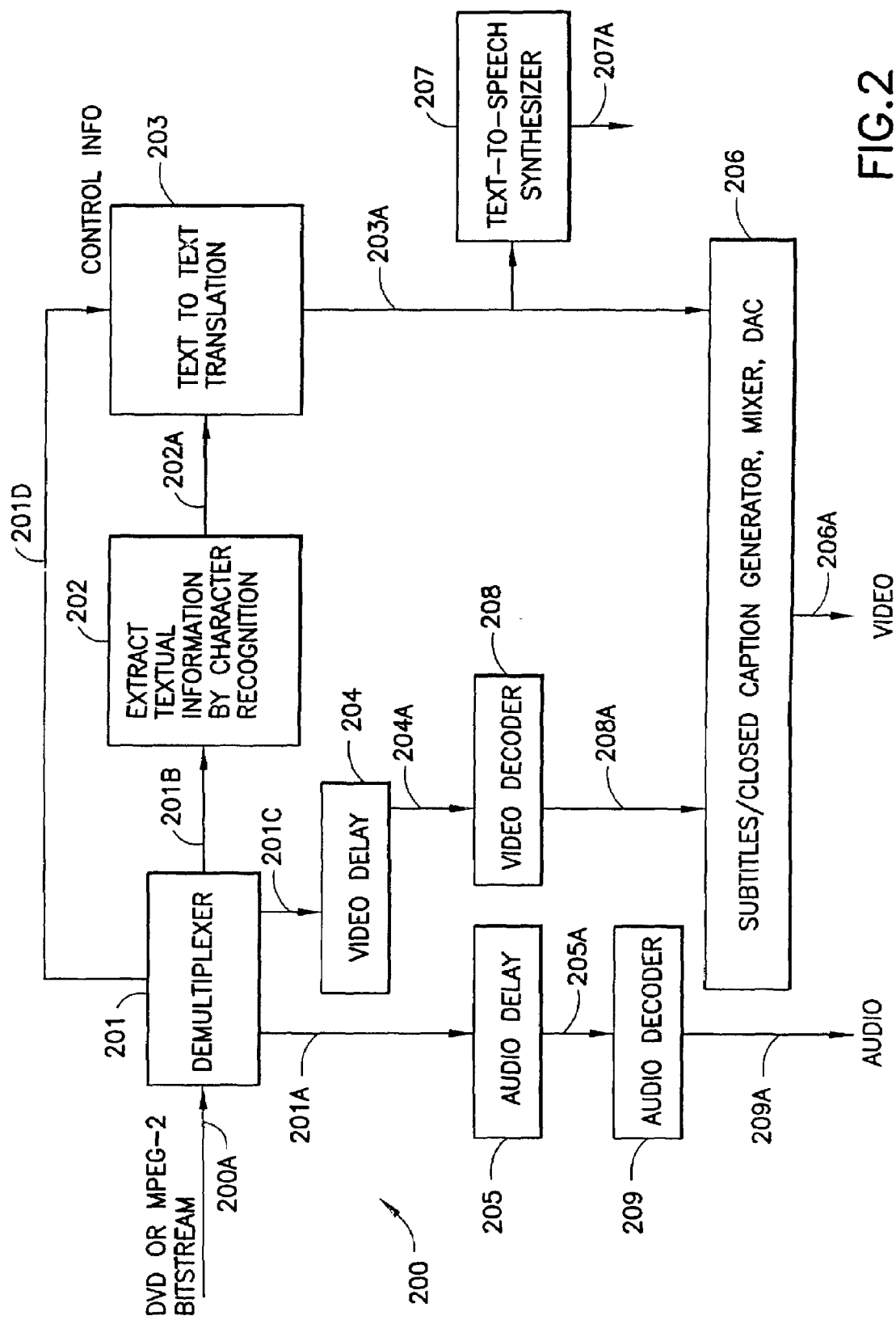
FIG. 2 is a block diagram of a second embodiment of apparatus for performing a subtitles translation according to the invention.
Figure 3B:
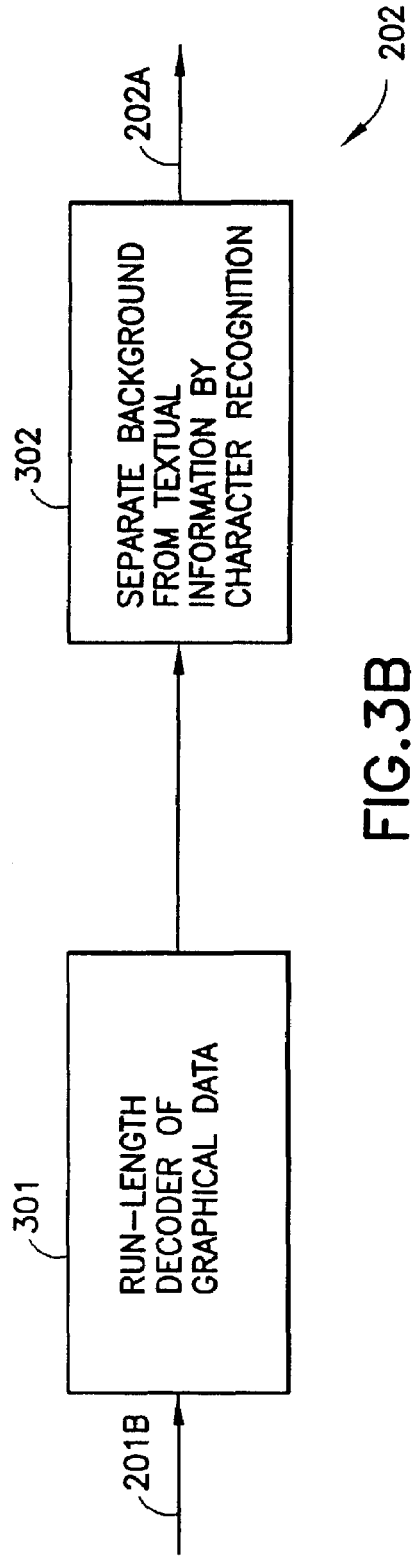
FIG. 3B is a block diagram of the text extraction and character recognition block of FIG. 2.

With reference to the system 200 shown in FIG. 2, in a further embodiment of this invention an input MEG-2 or DVD (by example) bit stream 200A is processed by a demultiplexer block 201 that extracts video, audio, subtitles and control data from their respective channels in the bit stream. The audio data 201A is stored in an audio delay buffer 205 to enable full synchronization with video and translated subtitles data at a later stage, and the video data output on line 201C from the demultiplexer 201 is recorded in a video delay buffer 204 to enable full synchronization with the audio and translated subtitles data at a later stage. The extracted subtitles data 201B are processed in a character recognition block 202 that has as an output 202A textual information in the original language. A block diagram of the character recognition block 202 is shown in FIG. 3B. First, a run-length decoding of the graphical data is performed by block 301, followed by a separation in block 302 of the background from the recognized characters. The characters can be recognized by any suitable means, preferably one based on correlation, and are output on line 202A.

Returning to FIG. 2, the textual information output on line 202A is processed further in a text-to-text machine translation block 203 which can be functionally identical to the corresponding block 103 shown in FIGS. 1 and 4. One function of block 203 is to automatically identify the language of the source if this feature is requested by the viewer. For the second embodiment of the invention now being described the automatic language detection performed in block 401 of FIG. 4 is based on control information 201D that is extracted in demultiplexer block 201 (such as a language code), or is based on the character set used in the source language and special features of languages. The text is then translated from the detected language to the language chosen by the viewer in block 402, as described above.

Still referring to FIG. 2, the buffered video data 204A and buffered audio data 205A are decoded by dedicated MPEG-2 video and audio decoders 208 and 209, respectively. The translated text 203A as well as the decoded video data 208A are multiplexed together in block 206, where either subtitles or closed captions with translated text are generated as shown in FIG. 5. As in the analog embodiment of FIG. 1, it may be desirable present the textual information as a speech signal by performing text-to-speech synthesis in block 207.

For the case where the second embodiment depicted in FIG. 2 is embodied as a module or a subsystem of a further system or audiovisual appliance, such as a DVD player or a set-top-box, the functionality of at least blocks 204, 205, 206, 208 and 209 can be performed by the further system as a part of its operation such that the system 200 may need to contain only those blocks shown as 201, 202, 203 and 207. That is, the functionality of the system 200, as well as the system 100, may be distributed over two or more systems. Further in this regard, and relevant also to FIG. 1, while the blocks shown in the Figures have been described as hardware blocks, a number of these blocks may be implemented by a suitably programmed data processor or data processors as algorithms and processes. Still further in this regard, the block diagrams of FIGS. 1–5 maybe viewed as well as logic flow diagrams, wherein the individual blocks are implemented by hardware circuitry, by software instructions executed by a data processor and stored on or within a computer-readable media, or by a combination of hardware and software instructions. Still further in this regard, and also relevant to FIG. 1, the blocks shown in the Figures may be integrated within one or more integrated circuits.

Figure 6:
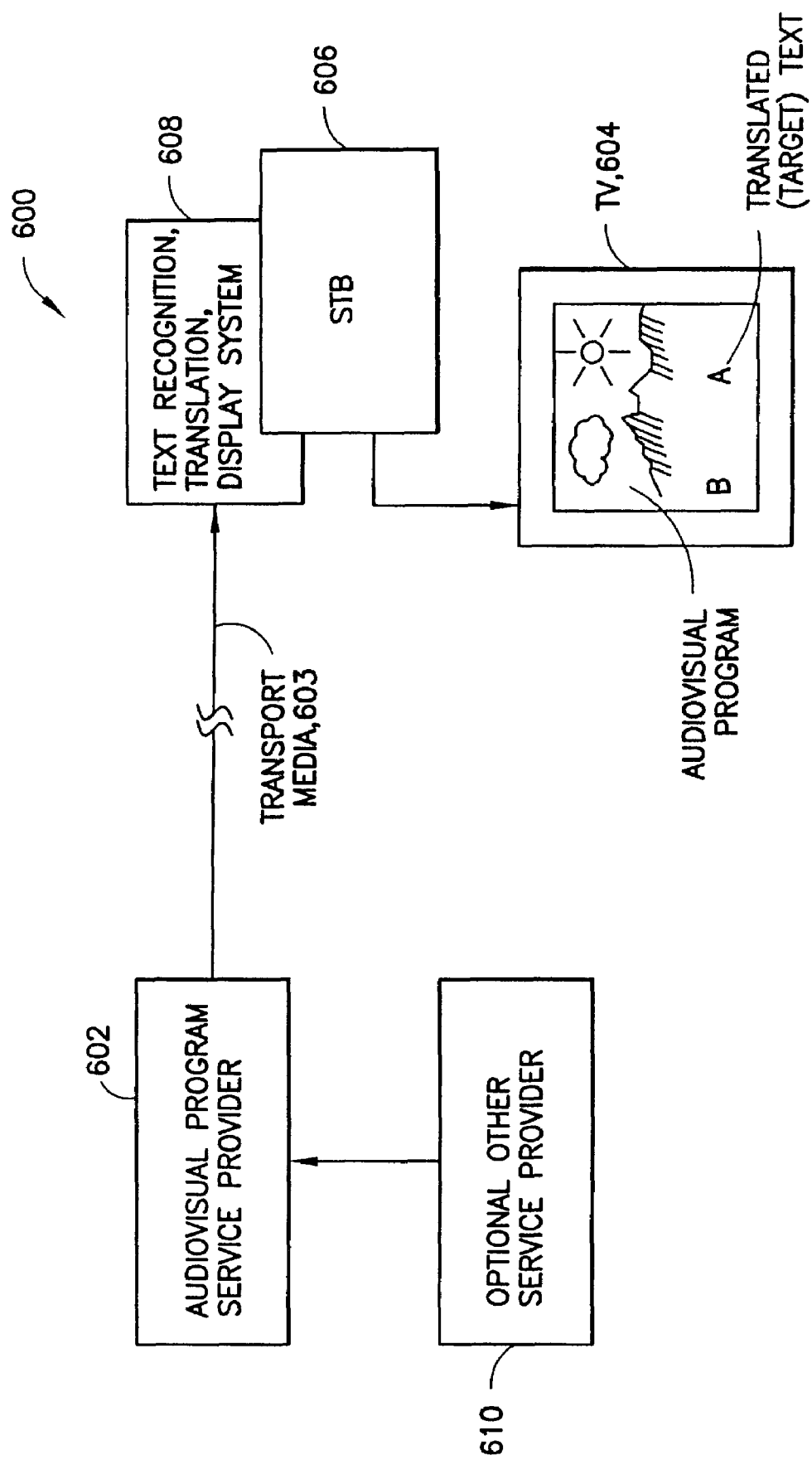
FIG. 6 is a block diagram of one exemplary embodiment of an audiovisual distribution system that incorporates the teachings in accordance with this invention.

Referring to FIG. 6, there is shown a non-limiting example of a video distribution system 600 that incorporates the teachings in accordance with this invention. An audiovisual program service provider 602 sends an audiovisual program to a viewer's audiovisual program receiver, such as a television 604, via an interface such as a set-top-box (STB) 606. The STB 606 may include the text recognition, translation and display system 608 in accordance with the embodiment of either FIG. 1 or FIG. 2, or the text recognition, translation and display system 608 may be provided as a separate, stand-alone unit. Alternatively, the text recognition, translation and display system 608 could be built into the audiovisual program receiver, such as the television 604.

The audiovisual program is sent to the STB 606 via any suitable transport media 603, such as through wiring in a cable, or through a fiber optic cable, or through a terrestrial transmitter, or through a satellite transmitter. The signal conveying the audiovisual program can be a point-to-point signal sent specifically to the viewer, or it can be a point-to-multipoint signal that is sent to a number of viewers simultaneously. A back channel (not shown) for providing viewer interactivity may also be employed.

In one embodiment a business process can be realized in which the operation of the text recognition, translation and display system 608 is provided as a service (with or without a fee) by the video service provider 602 or by some other entity 610. In this case the target language translation function may be selected to be activated by the viewer, and appropriate software is then enabled in the system 608 (and possibly also in the STB 606) or the software, if not already resident, may be downloaded to the system 608 (and possibly also to the STB 606) by the service provider 602 or by the other, third party entity 610.

In another embodiment it may be the case that all of the functionality of the system 608 is merged into and executed by the STB 606, and thus one inspecting the interface to the television 604 may not discern a specific component or module that could be readily identified as being associated only with the text recognition, translation and display system 608 of this invention. However, the presence of the text recognition, translation and display system 608 will be discernable by its functioning and the resultant visual and/or audio output.

In a further embodiment FIG. 6 is modified to derive the source of the audiovisual program from a DVD or from a VCR tape or from some other audiovisual storage media. In this case the text recognition, translation and display system 608 may be separate from or integrated with the DVD or VCR player.

While described above in the context of certain presently preferred embodiments of this invention, these teachings are not intended to be limited to only the disclosed embodiments, as changes in form and detail thereof may become apparent to those skilled in the art when guided by the foregoing teachings.

What is claimed is:

1. A method for presenting information to a user of an audiovisual appliance, comprising:

extracting source text from a graphical representation of the source text in an associated streaming audiovisual program;

automatically translating the extracted source text into a target text in a language different than a language of the source text; and presenting the target text in a human perceptible format in a synchronized manner with the associated streaming audiovisual program.

2. The method of claim 1, where translating the extracted source text comprises an initial step of identifying the source language.

3. The method of claim 1, where presenting the target text includes displaying the target text on a display screen.

4. The method of claim 1, where presenting the target text includes displaying the target text on a television screen.

5. The method of claim 1, where presenting the target text includes synthesizing speech for enunciating the target text to a viewer of the audiovisual program.

6. The method of claim 1, where said method is provided as a service by a service provider.

7. The method of claim 1, where said method is provided as a service by a service provider and is enabled upon command of the viewer.

8. The method of claim 1, where said method is provided as a service by a service provider and software required to execute the method is downloaded from the service provider.

9. The method of claim 1, where the audiovisual program is embodied in a television signal, and where the steps of extracting, translating and presenting occur in substantially real time as the television signal is received.

10. The method of claim 1, where the audiovisual program is embodied in a recorded television signal, and where the steps of extracting, translating and presenting occur in substantially real time as the recorded television signal is played back.

11. The method of claim 1, where the source text comprises a graphical subtitle.

12. The apparatus of claim 1, where the source text comprises a graphical subtitle.

13. Apparatus for presenting information to a user of an audiovisual appliance, comprising:
    means for extracting source text from a graphical representation of the source text in an associated streaming audiovisual program;
    means for automatically translating the extracted source text into a target text in a language different than a language of the source text; and
    means for presenting the target text in a human perceptible format in a synchronized manner with the associated streaming audiovisual program.

14. The apparatus of claim 13, where said means for translating the extracted source text comprises means for identifying the source language.

15. The apparatus of claim 13, where said means for presenting the target text comprises means for displaying the target text on a display screen.

16. The apparatus of claim 13, where said means for presenting the target text comprises means for displaying the target text on a television screen.

17. The apparatus of claim 13, where said means for presenting the target text comprises means for synthesizing speech for enunciating the target text to a viewer of the audiovisual program.

18. The apparatus of claim 13, where said apparatus is operated as a service by a service provider.

19. The apparatus of claim 13, where said apparatus is operated as a service by a service provider and is enabled upon command of the viewer.

20. The apparatus of claim 13, where said apparatus is operated as a service by a service provider and software required to operate said apparatus is downloaded from the service provider.

21. The apparatus of claim 13, where the audiovisual program is embodied in a television signal, and where the steps of extracting, translating and presenting occur in substantially real time as the television signal is received.

22. The apparatus of claim 13, where the audiovisual program is embodied in a recorded television signal, and where the steps of extracting, translating and presenting occur in substantially real time as the recorded television signal is played back.

23. A computer readable data storage media containing a program the execution of which implements a method for presenting information to a user of an audiovisual appliance, comprising extracting source text from a graphical representation of the source text in an associated streaming audiovisual program; automatically translating the extracted source text into a target text in a language different than a language of the source text; and presenting the target text in a human perceptible format in a synchronized manner with the associated streaming audiovisual program.

24. The computer readable data storage media of claim 23, where translating the extracted source text comprises an initial step of identifying the source language.

* * * * *